United States Patent [19]
De Almeida

[11] Patent Number: 5,385,746
[45] Date of Patent: Jan. 31, 1995

[54] PREPARATION OF CEREAL FOODS BY EXTRUSION COOKING

[75] Inventor: Joao De Almeida, Lutry, Switzerland
[73] Assignee: Nestec S.A., Vevey, Switzerland
[21] Appl. No.: 901,559
[22] Filed: Jun. 19, 1992

[30] Foreign Application Priority Data

Jul. 20, 1991 [EP] European Pat. Off. ......... 91112176

[51] Int. Cl.⁶ .............................. A23L 1/10; A23P 1/12
[52] U.S. Cl. .................................. 426/447; 426/448; 426/518; 426/549
[58] Field of Search ................ 426/447, 448, 518, 549

[56] References Cited

U.S. PATENT DOCUMENTS

| | | |
|---|---|---|
| 1,924,827 | 8/1933 | Anderson . |
| 4,218,480 | 8/1980 | Dyson et al. ............... 426/19 |
| 4,259,359 | 3/1981 | Spicer . |
| 4,568,550 | 2/1986 | Fulger et al. . |

FOREIGN PATENT DOCUMENTS

| | | |
|---|---|---|
| 2004149 | 6/1990 | Canada . |
| 0169106A1 | 1/1986 | European Pat. Off. . |
| 0267368 | 5/1988 | European Pat. Off. . |
| 195736 | 4/1989 | Japan . |

Primary Examiner—Donald E. Czaja
Assistant Examiner—Mary S. Mims
Attorney, Agent, or Firm—Vogt & O'Donnell

[57] ABSTRACT

Extrusion cooked cereal foods are prepared by mixing ingredients, including a cereal flour and water, to obtain a moist blend having a solids content of at least 70% by weight which then is extrusion cooked in a cooking stage of an extruder, and prior to extruding the cooked blend through a die, a compressed gas is injected into the cooked blend.

14 Claims, 1 Drawing Sheet

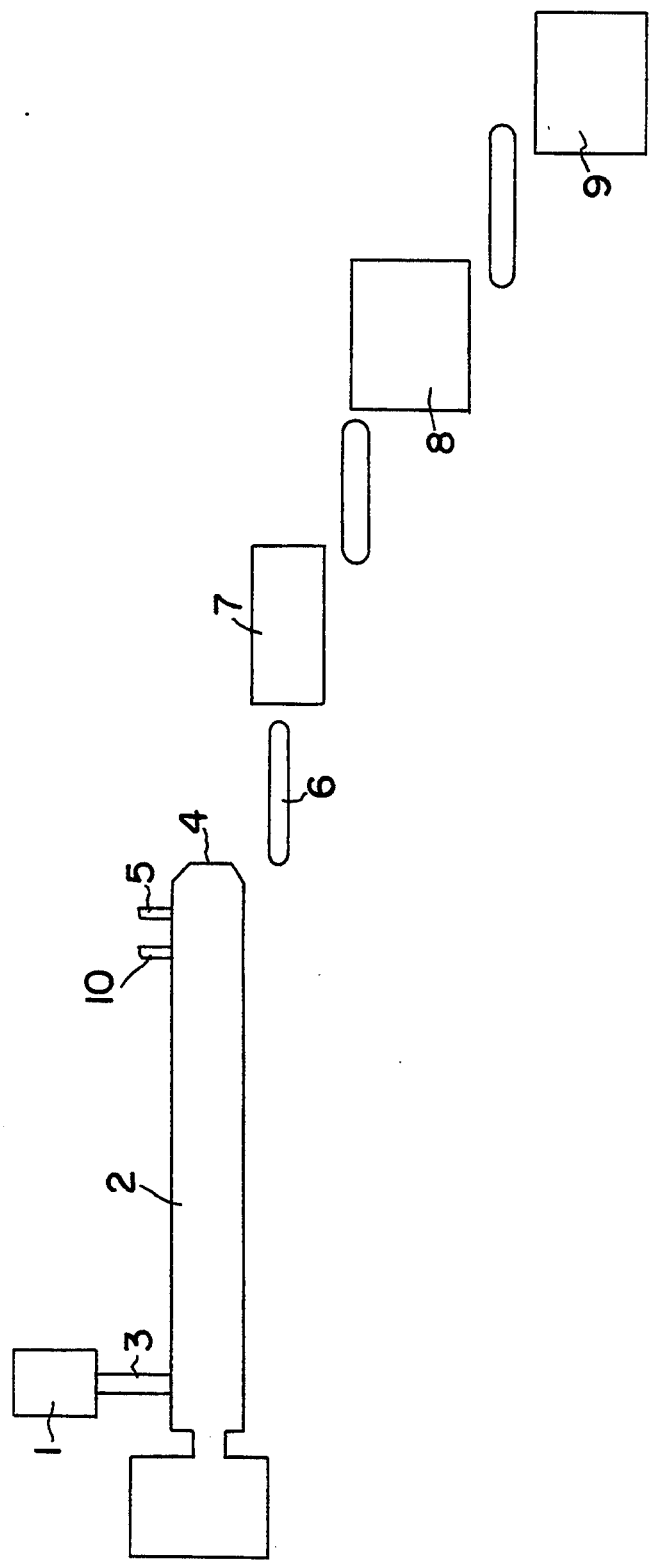

PREPARATION OF CEREAL FOODS BY EXTRUSION COOKING

BACKGROUND OF THE INVENTION

The present invention relates to a process for the production of a nutritional product prepared from an aqueous cereal composition through extrusion cooking.

More particularly, the invention relates to the production of precooked cereals to provide a precooked cereal food which can be prepared by merely admixing with water or milk.

It is well known to use a screw type extruder in which a cereal flour, admixed with water to adjust the water content to 12-30 percent by weight, is uniformly cooked and extruded as a continuous "rope" which is then sliced into pellets.

French Patent Application Publication No. 2 640 472 describes such a process in which a moistened cereal is cooked and extruded in an extrusion cooker.

On leaving the extruder die, the extruded product expands by a factor of about 3 and has a water content of about 12 to 20% by weight. This product is then sliced, partially dried, and ground in a mill with a 2.4 mm round hole screen.

The ground cereal product can then be dry mixed with supplementary thermosensitive ingredients.

The dry mixture is then granulated by any suitable agglomeration process, the resulting wet granular material being finally dried to a water content of about 4% to 7% by weight and packaged.

A ready-to-eat milk-dispersible cereal food is thus obtained.

The versatility of the extrusion-cooking process compared with drum drying is well known and the advantages of this process are for example avoidance of a large amount of floor space and of numerous operators. Nonetheless, extrusion cooking has several drawbacks.

First of all, since the product is intended to be a precooked cereal baby food, it is a major concern to be able to provide a dry product which, when mixed with a predetermined amount of milk, has a constant viscosity which, furthermore, is the same as the viscosity of cereal baby foods manufactured by drum drying.

On the other hand, it has been observed that extrusion cooking of cereals tends to push down the viscosity of the final product, and mothers, who are used to drum dried cereal baby foods, tend to lower the amount of added milk, which may lead to a nutritionally unbalanced product.

An object of the present invention is to provide an extrusion cooking process which, regardless of the formulation, leads to cereal baby foods having adequate viscosity when admixed with the proper amount of milk.

Moreover, extrusion cooking of cereals leads to a so-called "extrusion taste" which is an off-flavour released on admixing milk, and more particularly on admixing hot milk, and it is suspected that this "extrusion taste" is due to sulfur-containing compounds and other unknown compounds which are produced during extrusion-cooking probably because of the shearing of proteins and starch.

This problem is particularly acute in the manufacture of products where Maillard reactions do not occur, although Maillard reactions do not prevent the formation of sulfur-containing compounds but merely cover the "extrusion taste".

Another object of the present invention is to provide an extrusion cooking process which partly prevents the production of the extrusion taste.

Surprisingly, this taste is not observed with cereals obtained through drum drying. Such a difference could be explained by the fact that the solids content of the cereal slurry to be dried by conventional drum drying is always no greater than 50% by weight and usually greater than 25% by weight. It may be postulated that this high water content gives a very low viscosity when processing the base before drying and could prevent modifications of proteins and starch due to the absence of shearing.

The water content is much lower in extrusion cooking process in order to make it more energy efficient, the upper limit being a water content of the moist blend to be processed of no greater than 30% by weight. Furthermore, with such a high water content, the product would not puff at the die because it is too wet.

A further object of the present invention is to provide an extrusion-cooking process of the aforementioned type wherein the moist blend to be cooked has a solids content of at least 70% by weight.

SUMMARY OF THE INVENTION

It has been found that there is a very close relationship between the viscosity of the final product and the density of the extruded product, and the lower the density, the higher is the viscosity.

More particularly, it has been found that a moist blend of cereals having a solids content of at least 70% by weight can be processed through extrusion cooking, avoiding the aforementioned drawbacks, if a compressed gas is injected into the blend in the last part of the extrusion cooking apparatus close to the die.

In this way, the compressed gas, which is contained in the blend, tends to provide an additional puffing effect upon release from the die, the puffing effect being proportional to the gas content of the extruded product. It can be suggested that the added gas could provide nucleation sites for water vapour formation.

There is thus provided a very simple means of regulating the puffing effect and, thereby, the density of the extruded product wherein the smaller the amount of gas injected, the denser is the extruded product.

Furthermore, when the compressed gas is expelled from the extruded product, upon release from the die, it sweeps away sulfur-containing compounds from the extruded product.

DETAILED DESCRIPTION OF THE INVENTION

The present invention provides a process for the production of precooked cereal foods in which a moist blend of cereals having a solids content of at least 70% by weight is processed by extrusion cooking, wherein a compressed gas is injected in the blend at the end of the cooking stage, before the extrusion stage, in the last part of the extrusion cooking apparatus close to the die, and hence, prior to extruding the cooked blend through a die, the compressed gas is injected into the cooked blend.

By the present invention, a moist blend of cereals is processed through extrusion-cooking.

The moist blend to be processed may be a cereal flour, for example rice flour or wheat flour, optionally with supplementary ingredients such as milk.

The moist blend may be prepared by mixing dry ingredients with the appropriate amount of water in a mixer in order to get good uniformity of the blend to be processed. It is also possible to introduce separately the dry ingredients and water in an extrusion cooker provided with a mixing zone.

It is also possible to separately prepare a dry flour and a wet flour composed by a flour admixed with water in order to get a slurry having a solids content of approximately 30%–40% by weight. This slurry is then introduced with the dry flour into the extrusion cooker. In that way it is possible to get a very good hydration of the flour without the disadvantage of being obliged to use a high shearing treatment. Preferably, in order to reach a solids content of the extruded product of at least 70% by weight, the slurry is made with approximately 10% to 30% of the total amount of flour.

The moist blend is cooked in the extrusion cooker at a temperature in the range from about 100° C. to about 180° C. and a pressure from about 70 to about 130 bar.

At the end of the cooking stage, compressed gas is injected into the blend in the last part of the extrusion cooker close to the die.

The compressed gas may be air, nitrogen or carbon dioxide, or a mixture of these gases.

Air has the main advantage of being the cheapest, whereas nitrogen has the advantage of producing smaller bubbles in the extruded product than carbon dioxide, thereby allowing a better regulation of the density of the extruded product. However, carbon dioxide has the advantage to allow the best solubility of the off-flavours causing the extrusion taste, and therefore allows a better elimination of the off-flavours.

Particularly preferred is a combination of nitrogen and carbon dioxide depending, on one hand, on the density which is to be obtained having regard to the composition of the blend, and, on the other hand, on the amount of off-flavours which is to be extracted from the extruded product.

If it is not possible to introduce sufficient compressed gas to sweep away off-flavours, for example if introduction of the required amount of gas to expel off-flavours would lead to a product of lower density than desired, the blend may be subjected to degassing. This may be achieved, for example, by drawing a vacuum to remove gas entrapped in the blend at the end of the cooking stage before injection of the compressed gas.

Upon leaving the die, the pressure drop produces a puffing effect leading to an expansion of the extruded product by a factor of about 2–5. The "puffed" product is then cut at the die and ground.

If desired, sugar may be added to the product before grinding, for example by spraying in a tumbler. In this way, the extrusion cooking of the blend, without sugar, provides a whitish product, whatever the cereal, without a scorched appearance.

The product is finally dried to a water content of about 2 to about 5% by weight and packaged.

The invention is further described with reference to the accompanying drawing.

The accompanying drawing shows a schematic side elevational view of apparatus for use in the present invention.

DETAILED DESCRIPTION OF THE DRAWING FIGURE

Preferably, apparatus for use in the present invention consists of a mixer 1 and an extrusion cooker 2. The mixer 1 may be a twin shaft mixer with intermeshing paddles which is known to deliver a uniform blend of water and cereals. The moist blend may be transported into the extrusion cooker 2 by means of a feed device 3, e.g., a feed screw. In another embodiment, a dry cereal flour and a wet cereal flour are separately prepared and introduced together into the extrusion cooker by means of the feed device 3.

The extrusion cooker 2 is preferably a twin screw low shear extruder consisting of a barrel enclosing two continuous intermeshing co-rotating or counter-rotating screws and terminating at a die extrusion plate 4. Various screw configurations may be used for cooking the blend.

At the end of the extrusion cooker 2, close to the die, a compressed gas inlet 5 is provided to inject compressed gas into the blend being processed. In order to inject the gas in an efficient way, a special screw configuration is preferred. Mixing discs, known as "bilobes" and manufactured by CLEXTRAL, are oriented negatively on the screws and located at the inlet of the gas into the extrusion cooker 2. This particular disposition allows on the one hand a good mixing of the gas and the product and, on the other hand, prevents the gas from leaking out through the inlet of the extrusion cooker.

The cut puffed pieces, produced by the extrusion cooker 2, are conveyed, for example by a conveyor belt 6, to an optional tumbler 7 where liquid sugar may be sprayed onto the pieces and thence to a drying oven 8, followed by a grinder 9. The ground product may be packaged or directly stored.

A gas outlet 10, connected to a vacuum pump, may be provided at the end of the cooking zone before the compressed gas inlet 5.

The present invention is further illustrated by the following example.

EXAMPLES

A rice flour was treated according to the invention in a twin screw extruder (CLEXTRAL BC 72 type) with different quantities of nitrogen injected into the extruder.

The results below illustrate the influence of the nitrogen injection on the density of the final product and its colour.

Since it is not easy to measure the quantity of nitrogen introduced into the extrusion cooker, only the pressure of the gas at the gas inlet 5 is measured. It is understood that the higher the pressure, the greater the amount of nitrogen which is introduced.

| Input rice flour into the extruder | Water addition (%) | Nitrogen injection pressure (bar) | Density (milled, dried) | Colour |
|---|---|---|---|---|
| 230 kg/h | 14 | 7 | 300 g/l | Grey |
| 200 kg/h | 16 | 80 | 187 g/l | White |
| 200 kg/h | 16 | 70 | 193 g/l | White |
| 200 kg/h | 16 | 50 | 210 g/l | Slightly grey |

I claim:

1. A process for preparing a food comprising mixing ingredients, including a cereal flour and water, to obtain a moist ingredient blend having a solids content of at least 70% by weight, extrusion cooking the moist blend in an extrusion cooking stage of an extruder to obtain a cooked blend and prior to extruding the cooked blend from the extruder through a die, injecting a compressed gas into the cooked blend and then extruding the gas-injected cooked blend through the die to obtain an extruded product.

2. A process according to claim 1 further comprising prior to introducing the compressed gas into the cooked blend, degassing the cooked blend and then introducing the compressed gas into the degassed cooked blend.

3. A process according to claim 1 or 2 wherein the compressed gas is selected from the group consisting of air, nitrogen and carbon dioxide.

4. A process according to claim 1 or 2 wherein the compressed gas is a mixture of nitrogen and carbon dioxide.

5. A process according to claim 1 or 2 further comprising preventing gas injected into the cooked blend from leaking from the extruder.

6. A process according to claim 1 or 2 further comprising disc mixing the cooked blend and the gas injected into the cooked blend.

7. A process according to claim 1 or 2 further comprising bilobially mixing the cooked blend and the gas injected into the cooked blend.

8. A process according to claim 1 or 2 wherein the moist blend is extrusion cooked at a temperature of from about 100° C. to about 180° C.

9. A process according to claim 1 or 2 wherein the moist blend is prepared by mixing the ingredients in the extruder.

10. A process according to claim 1 or 2 wherein the moist blend is prepared by first mixing a portion of the flour with water to obtain a first flour and water mixture and then mixing a further portion of the flour with the first mixture to obtain the moist blend and then extrusion cooking the moist blend.

11. A process according to claim 10 wherein the first mixture has a solids content of from approximately 30% to 40% by weight.

12. A process according to claim 11 wherein the first mixture contains about 10% to 30% by weight of a total amount of the flour of the moist blend.

13. A process according to claim 1 or 2 wherein the flour is selected from the group consisting of rice flour and wheat flour.

14. A process according to claim 1 or 2 wherein the moist blend of ingredients further includes milk.

* * * * *